United States Patent
De Block (10) Patent No.: US 6,449,797 B1
(45) Date of Patent: Sep. 17, 2002

(54) DEVICE FOR HINGEDLY CONNECTING A WIPER BLADE FOR WINDSHIELDS IN MOTOR VEHICLES TO A WIPER ARM

(75) Inventor: Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,745
(22) PCT Filed: Oct. 23, 1999
(86) PCT No.: PCT/DE99/03402
§ 371 (c)(1), (2), (4) Date: Dec. 6, 2000
(87) PCT Pub. No.: WO00/50276
PCT Pub. Date: Aug. 31, 2000

(30) Foreign Application Priority Data

Feb. 23, 1999 (DE) .......................... 199 07 629

(51) Int. Cl.⁷ ................................ B60S 1/40
(52) U.S. Cl. .............. 15/250.201; 15/250.32; 15/250.43; 15/250.351
(58) Field of Search ................ 15/250.37, 250.43, 15/250.44, 250.451, 250.361, 250.201, 250.351

(56) References Cited

U.S. PATENT DOCUMENTS 3,147,507 A * 9/1964 Glynn ..................... 15/250.32
3,254,358 A * 6/1966 Wise ...................... 15/250.32
5,732,437 A * 3/1998 Jonasson et al. ....... 15/250.201

FOREIGN PATENT DOCUMENTS

DE      1028896    *  4/1958   .............. 15/250.43
DE      2313689    * 10/1974   .............. 15/250.32
DE   81 19 737.3     12/1982
DE   198 16 409 A    10/1998
DE   197 29 865 A     1/1999

* cited by examiner

Primary Examiner—Gary K. Graham
(74) Attorney, Agent, or Firm—Michael J. Striker (57) ABSTRACT

A device for pivotally connecting a wiper blade (12) for motor vehicle windows (10) to a wiper arm (14) which can be moved between reversal positions and is guided on the vehicle. On its free end section, the wiper arm (14) is provided with a pivot bolt extending essentially in the movement direction for connecting an elongated wiper blade, which has an elongated elastic support element (22) whose underside oriented toward the window has a wiper strip (20) disposed on it, which can be placed against the window (10), and the support element is provided with a transverse bore (68) that is open toward its top, whose opening width constitutes a narrow point (72) that is narrower than the bore diameter, wherein the edge regions of the narrow point can be elastically spread open to the size of the bore diameter. The particular demands on the support and on the transverse bore or the narrow point in order to connect the wiper arm are taken into consideration if the support element has at least one band-like, elongated, spring-elastic support strip for holding the wiper strip (20), whose top (37) remote from the window (10) has a coupling element (46) disposed on it, which is made of an elastic plastic and is provided with the transverse bore (68).

13 Claims, 5 Drawing Sheets

DEVICE FOR HINGEDLY CONNECTING A WIPER BLADE FOR WINDSHIELDS IN MOTOR VEHICLES TO A WIPER ARM

BACKGROUND OF THE INVENTION

The invention relates to a device for pivotally connecting a wiper blade for use on motor vehicle windows to a wiper arm. In a known device of this type (German Utility Model 81 19 737), a pivot pin is formed onto a wiper arm made of plastic and, by means of a longitudinal slit, can engage in detent fashion in a transverse bore disposed in a frame part which is made of an elastic plastic and is used as a wiper strip support. This presents difficulties in the material selection both for the wiper arm and for the frame part. The wiper arm, for example, must have the required rigidity, which places limitations on the material selection for the frame part as a sliding partner for the pivot pin. Contrary demands are placed on the frame part itself. On one hand, it should be possible to elastically widen the narrow point in the longitudinal slit to such a degree that the pivot pin can engage in detent fashion in the transverse bore and is securely held during wiper operation and on the other hand, in a plane perpendicular to the window to be wiped, the frame part should adapt in a spring-elastic manner to the window surface and should be relatively stiff in the wiping movement that occurs lateral to the longitudinal direction of the wiper blade. All of these requirements can be accommodated only be making unsatisfactory compromises.

ADVANTAGES OF THE INVENTION

In the device according to the invention, it is possible to manufacture the wiper strip support out of a material, for example, a spring band steel, which fulfills all of these stated requirements. For the coupling element disposed on this wiper strip support, there are a multitude of plastics available whose properties are favorable as a sliding partner for the pivot bolt and also for the ability of the narrow point to be elastically spread open.

In order to achieve a particularly low profile of the wiper blade together with the connecting device, the support has two elongated support strips comprised of a spring-elastic metal, which are disposed in longitudinal grooves that open toward the longitudinal sides of the wiper strip, wherein over at least one longitudinal section, the support strips respectively protrude laterally out from the longitudinal grooves with an edge strip so that the coupling element can be secured to the two edge strips of the support strips.

In order to secure the support strips in their longitudinal grooves lateral to their longitudinal span, claw-like projections that protrude toward the window are disposed on the longitudinal sides of the coupling element and on its underside oriented toward the support strips, and with one L leg, each of these claws intersects a plane in which the two support strips are disposed and the respective other L legs extending from the first L legs are directed toward each other and engage under the edge strips of the support strips. In this connection, it is unimportant whether the other L legs come into direct contact with the underside of the support strips or whether there is an intermediary layer, for example an extension of the wiper strip, between these support strips and the edge strips.

In an improvement of the invention, the device is provided with locking means for securing the operating position between the transverse bore and the pivot pin. This permits a higher degree of operational reliability for the pivotal connection between the wiper arm and wiper blade.

Suitably, the locking means have a stop shoulder disposed on the wiper arm, pointing away from the window, and this stop shoulder is associated with an opposing shoulder of the wiper blade oriented toward the window.

A particularly simple and compact embodiment of the connecting device is produced if the stop shoulder is embodied on an angular projection of the wiper arm that protrudes toward the window.

If the wiper arm, at least in the vicinity of the pivot bolt, has two side walls spaced apart from and parallel to each other, which protrude toward the window, each of which secures an end of the pivot bolt, the pivot bolt, which is produced as a separate component, can also be made of a material that is particularly suited for its function.

In order to achieve a stable wiper arm, which simultaneously protects the connecting device from environmental influences, and thereby significantly extends its service life, the side walls are constituted by the U legs of the wiper, which has a U-shaped cross section, at least in parts, wherein the projection is disposed on the inside of the U base oriented toward the window and the U legs encompass longitudinal sides of the coupling element.

A particularly favorable guidance of the wiper blade lateral to its longitudinal span and thereby a smooth wiper operation is produced if the distance between the U legs is matched to the distance between two opposite longitudinal side faces of the coupling element.

To further improve the protection from environmental influences, the U base of the wiper arm covers over the narrow point of the transverse bore in the operating position.

A particularly simple, stable, and inexpensive design of the coupling element is achieved if, in a further embodiment of the invention, the coupling element has a base plate provided with claw-like projections, which supports a box-like structure, if the side walls extending in the longitudinal direction of the wiper blade are also connected to each other by a support block that contains the transverse bore, and if a slit remains between the top wall of the structure and the support block. In this connection, the support block ensures the strength of the structure and the slit permits a passage of the angular arm projection so that its stop shoulder can be brought into its operating position.

If a recess is disposed between the support block and the base plate of the coupling element, then there is inevitably an insertion space for the one leg of the angular projection disposed on the wiper arm.

In a continuation of this embodiment, with corresponding adaptation, the opposing shoulder of the wiper blade is inevitably produced on the underside of the support block.

Particular additional measures for maintaining an operationally reliable pivotal connection can be eliminated if the stop shoulder of the wiper arm is disposed directly opposite and in immediate vicinity of the opposing shoulder of the wiper blade when the wiper arm is in the initial operating position.

In a wiper blade with a wind deflecting strip that extends beyond the upper band surface of the support element, it is suitable to dispose the coupling element in a recess of the wind deflecting strip.

In order to improve the installation process, in a wiper blade with a wind deflecting strip, viewed in the longitudinal direction of the wiper blade, the box-like structure of the coupling element is offset in relation to its base plate to the side toward which a flow bevel embodied on the wind deflecting strip points.

In order to improve the contact behavior of the wiper blade against the window even at high driving speeds, the U leg of the wiper arm that the driving wind predominantly flows against is provided with a bevel that serves as a wind deflecting strip, wherein in order to maintain a low profile of the wiper blade and coupling element connected to the wiper arm, the part of the box-like structure disposed in the vicinity of this bevel is adapted to the course of this bevel.

Other advantageous improvements and updates of the invention are disclosed in the following description of an exemplary embodiment shown in the accompanying drawings.

DETAILED DESCRIPTION OF THE PREFERRED EMBODIMENTS

Figure 1:
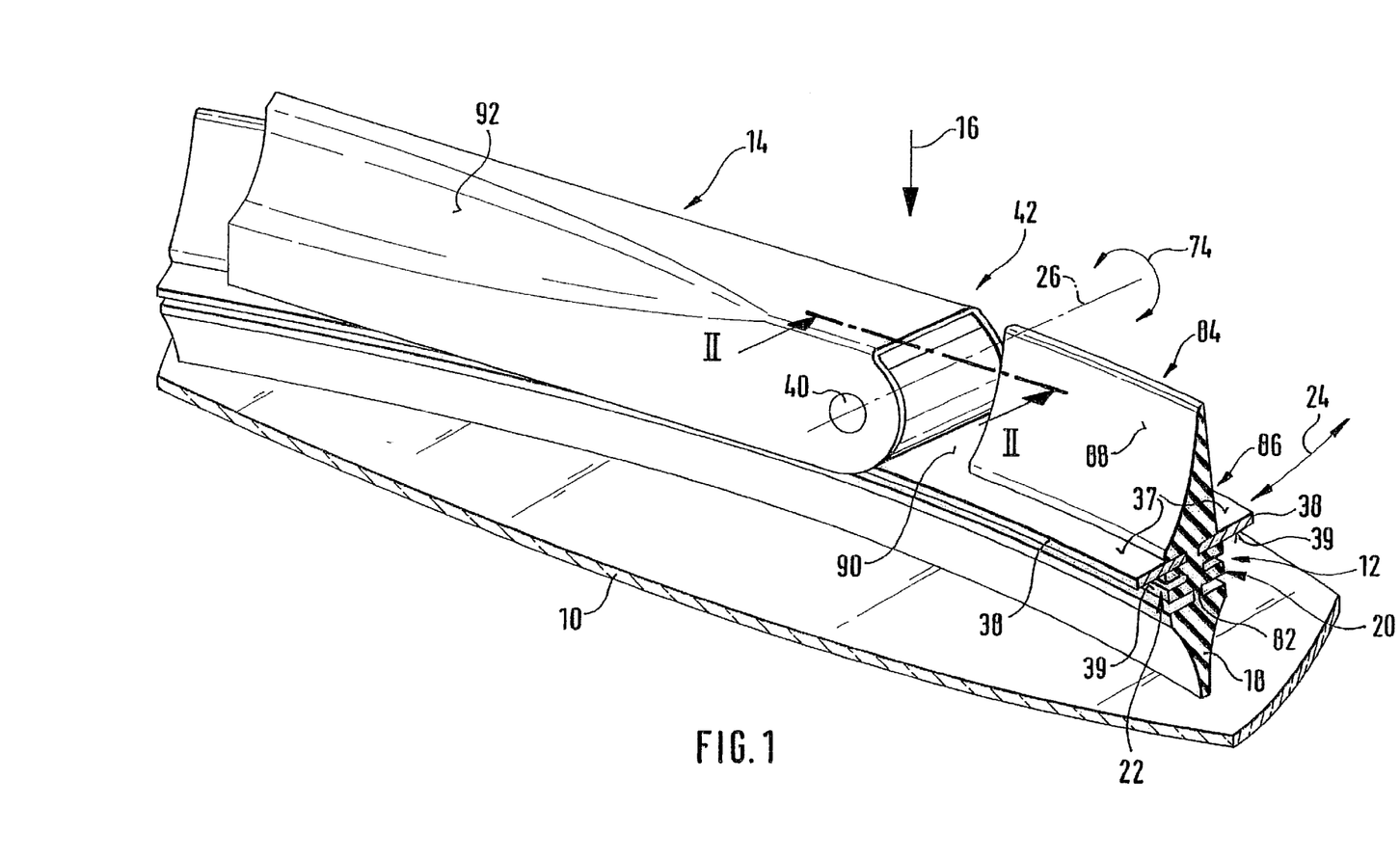
FIG. 1 is a perspective partial depiction of a wiper blade that is connected to a wiper arm by means of a connecting device and has a wiper strip that is placed against the window to be wiped.

A central section of a wiper blade 12, shown in a perspective depiction in FIG. 1, which is placed against a window 10 of a motor vehicle, is connected to the free end of a wiper arm 14 guided on the motor vehicle. The wiper arm 14 is loaded toward the window 10 in the direction of the arrow 16 and places the wiper blade 10 with the wiper lip 18 of its elongated, rubber elastic wiper strip 20 against the surface of the window 10 to be wiped. The wiper strip 20 is secured by a band-like, elongated support element 22 which in the exemplary embodiment, includes two longitudinal strips made of metal, which will be discussed in more detail below. The support element, however, can also be embodied as a one-piece metal band whose lower band surface oriented toward the window 10 has the wiper strip disposed on it and protrudes with edge strips laterally beyond the wiper strip 20. The articulating connection between the wiper arm 14 and wiper blade 12 permits a continuous adaptation of the wiper lip 18 to the as a rule spherically curved window 10 when the wiper blade executes its wiping motion (double arrow 24) lateral to its longitudinal span between two reversal positions. In this connection, the wiper blade 10 pivots around a pivot axis 26 that is depicted with dot-and-dash lines in FIG. 1.

Figure 2:
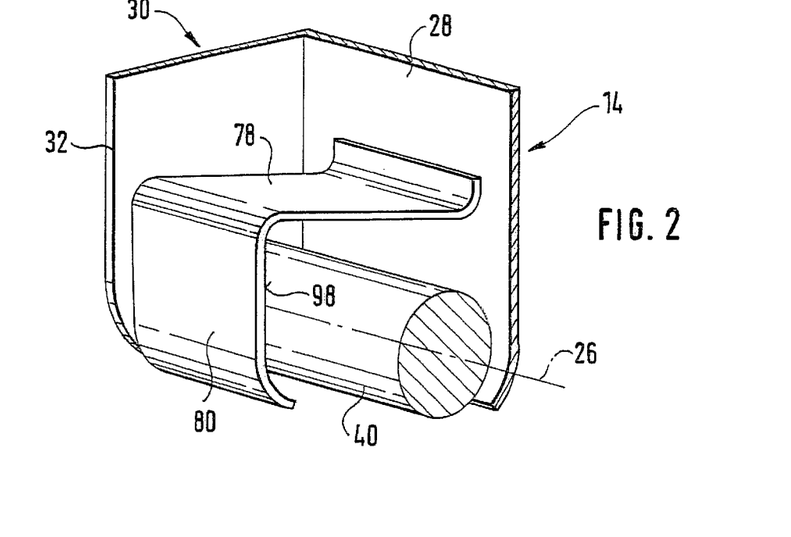
FIG. 2 is an enlarged perspective depiction of the part of the connecting device oriented toward the arm, shown in the pre-installation position in a sectional view along the line II—II in FIG. 1.
Figure 8:
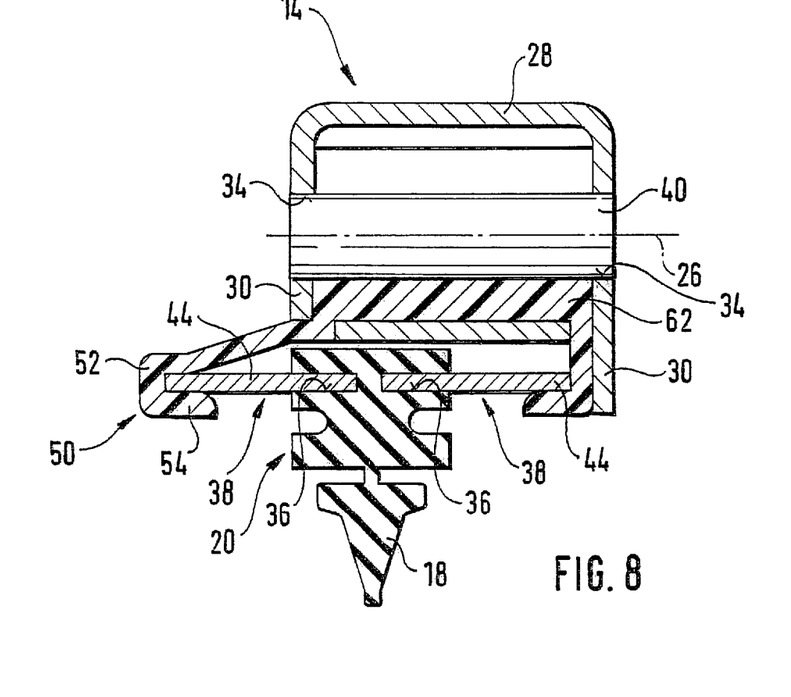
FIG. 8 shows the sectional plane of a section through the device according to FIG. 6, in a sectional view along the line VIII—VIII.

FIG. 2 shows the design of the free end of the wiper arm 14 with regard to the connecting device according to the invention. In its free end section shown in this drawing, the wiper arm has an essentially U-shaped cross section with a U base 28, which is adjoined by two U legs 30. The U legs 30 are oriented toward the window 10. They are spaced apart from and parallel to each other in the operating or movement direction (double arrow 24). The legs 30 extend to the free end of the wiper arm 14 and constitutes sidewalls 32 there, which are disposed protruding toward the window 10. FIG. 8 also shows that each of the two sidewalls 32 is penetrated by a support bore 34 and that both bores have a common longitudinal axis which is identical to the pivot axis 26. The support bores 34 secure the two ends of a pivot bolt 40 which belongs to wiper arm part of a connecting device 42 with which the wiper blade 12 can be connected to the wiper arm 14. The pivot bolt 40 extends essentially in the direction of the wiping motion of the wiper blade (double arrow 24).

Figure 3:
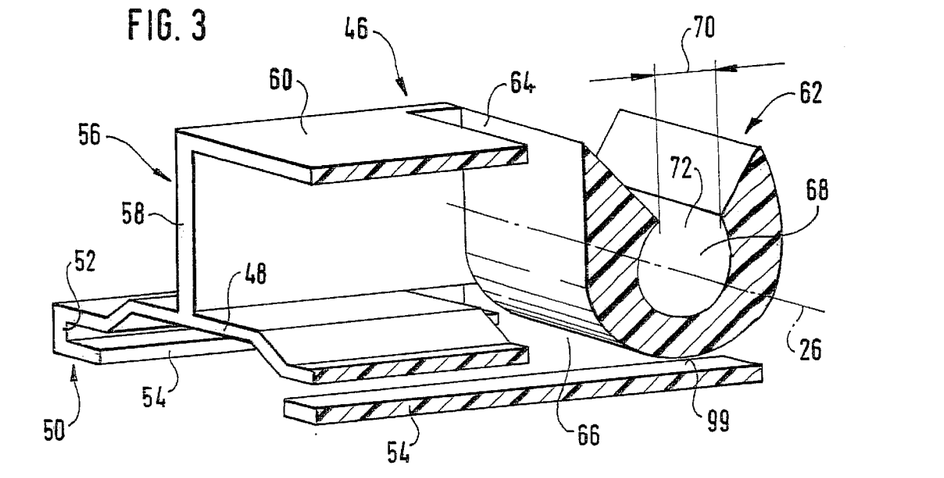
FIG. 3 is an enlarged perspective depiction of the coupling element of the connecting device oriented toward the wiper blade, shown in the pre-installation position in a sectional view along the line II—II in FIG. 1.
Figure 4:
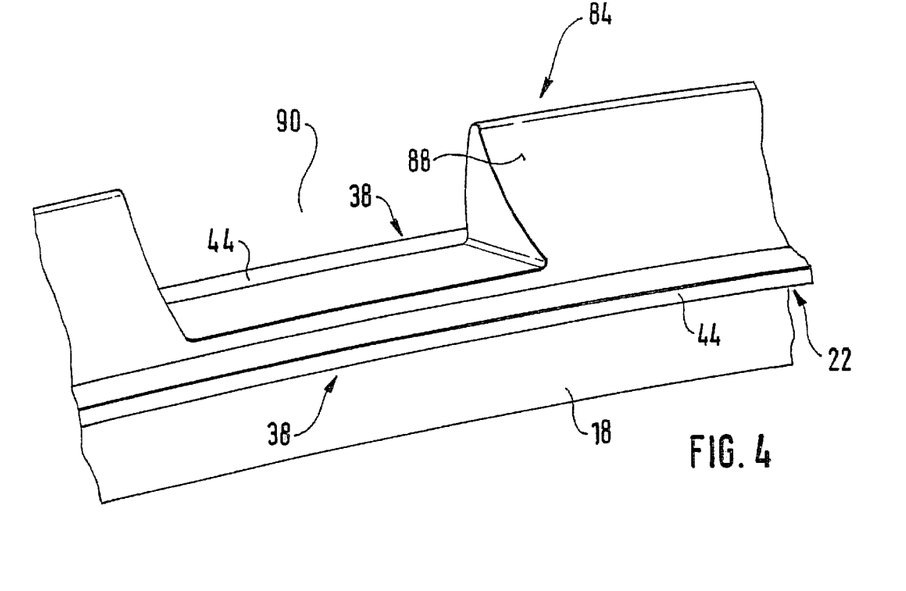
FIG. 4 is an enlarged depiction of the central section of the wiper blade according to FIG. 1, with the coupling element removed.
Figure 5:
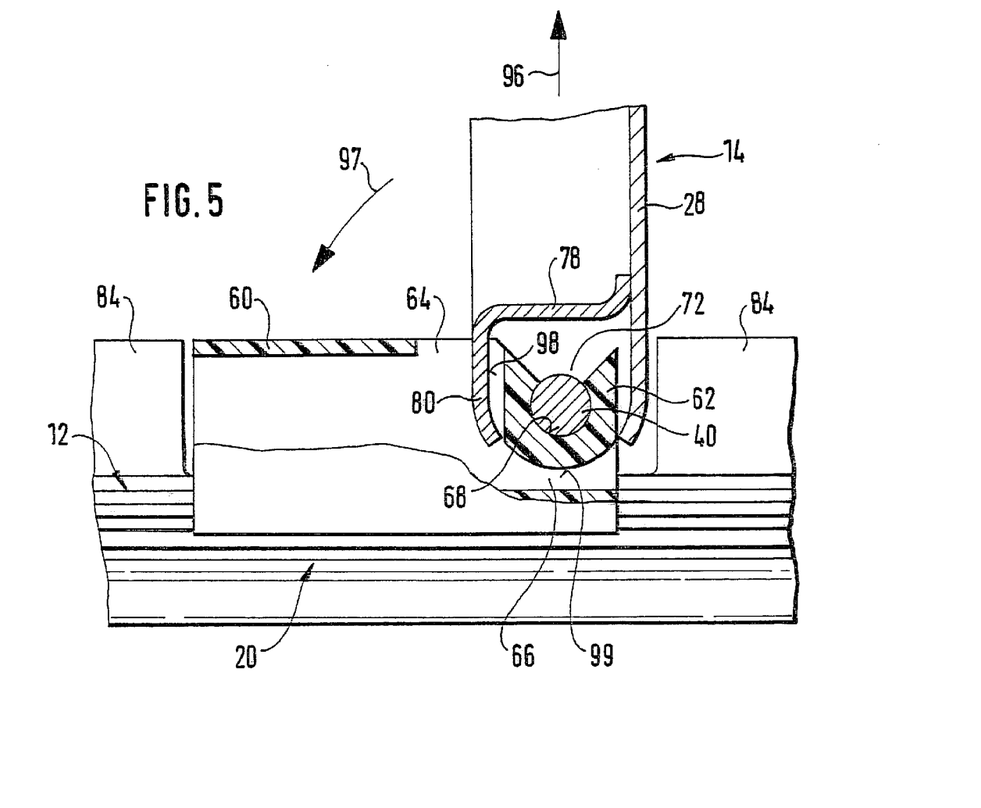
FIG. 5 is a reduced depiction of the wiper arm and wiper blade in an intermediary installation position, in a sectional view that corresponds to FIGS. 2 and 3.
Figure 7:
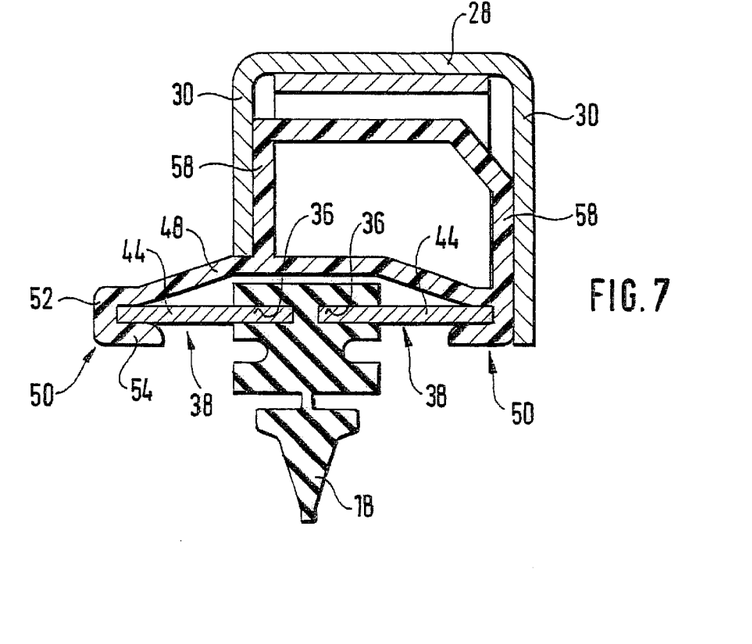
FIG. 7 shows the sectional plane of a section through the device according to FIG. 6, in a sectional view along the line VII—VII.

The embodiment of the wiper blade 12 is shown in particular by FIGS. 1, 4, 7, and 8. These Figs. show that the elongated rubber-elastic wiper strip 20 has two longitudinal grooves 36 spaced apart from the window 10 to be wiped, which are open at the edge toward the opposite longitudinal sides of the wiper strip 20. The longitudinal grooves 36 are disposed in a common plane and are used to respectively contain one of the above-mentioned longitudinal strips 38, whose length approximately corresponds to the length of the wiper strip 20. The two longitudinal strips 38 are made of a spring-elastic material and protrude from their longitudinal grooves 36 with edge strips 44. They represent important parts of the support element 22 which, in the exemplary embodiment, is split in the longitudinal direction of the wiper blade 12. A coupling element 46 is secured to the edge strips 44 of the longitudinal strips 38 and represents the wiper blade part of the connecting device 42. The coupling element 46 has a base plate 48, which transversely overlaps the two longitudinal strips 38 lateral to their longitudinal span. On its longitudinal sides or on the longitudinal sides of its base plate 48, the coupling element 46 is provided in with claw-like projections 50, which extend toward the window 10 and have an L-shaped cross section. The one L leg 52 of each claw is connected to the base plate 48 and intersects the plane in which the two longitudinal or support strips 38 are disposed. Spaced apart from the base plate 48, the first L legs 52 transition into the other L legs 54. These other L legs are disposed so that they point toward each other starting from the first L legs. It is particularly clear from FIGS. 7 and 8 that the claw-like projections 50 engage with their other L legs 54 under the edge strips 44 of the support strips 38. The coupling element 46 is consequently secured to the two edge strips 44 of the longitudinal or support strips 38. At the same time, the coupling element 46 holds the support strips 38 lateral to their longitudinal span securely in the longitudinal grooves 36 of the wiper strip 20. On the top band surface 37 of the longitudinal strips 38 remote from the window 10, a box-like structure 56 is disposed on the base plate 48 of the coupling element 46 (FIGS. 3 and 7). The box-like structure 56 extends in the longitudinal direction of the wiper blade 12. Consequently, it has two side walls 58 that are spaced apart from each other and are connected to the base plate 48, which are in turn connected to each other spaced apart from the base plate by means of a cover plate 60. A support block 62 disposed at its one end serves to further stabilize the structure 56 and likewise connects the two sidewalls 58 to each other. The cover plate 60 ends spaced apart from the support block 62 so that a slot 64 remains between it and the end of the cover plate 60 oriented toward this support block. An opening 66 is disposed between the base plate 48 and the support block 62 (FIG. 5). Lateral to the longitudinal span of the wiper blade, the support block 62 is provided with a transverse bore 68 which opens toward the top of the wiper blade 12 oriented away from the window 10, in the longitudinal direction of the bore. The width 70 of this slit-like opening 72 is narrower than the diameter of the transverse bore 68 so that the opening 72 constitutes a narrow point. The coupling element 46 is made of an elastic plastic which makes it possible to insert the pivot bolt 40 of the wiper arm 14 into the transverse bore 68 by elastically spreading open the edge regions of the narrow point 72. The diameter of the transverse bore is matched to the diameter of the pivot bolt 40 to permit a relative movement between the wiper arm 14 and the coupling element 46 or the wiper blade 12 connected to it around the pivot axis 26 because the longitudinal axis of the pivot bolt 40 and the longitudinal axis of the transverse bore 68 are congruent when the wiper blade is installed on the wiper arm (FIGS. 1, 5, 6, and 8).

The sidewalls 32 are embodied on the insides of the U legs 30 of the wiper arm 14; the distance between the two sidewalls is matched to the distance between the outsides of the sidewalls 58 of the structure 56 so that the pivoting motion (double arrow 74 in FIG. 1) is not impaired and so that the pivotal connection is as free of play as possible in the direction of the pivot axis 26.

As shown in particular by FIG. 2, in the vicinity of the pivot bolt 40, the wiper arm 14 is provided with an angular projection 76, which is disposed protruding from the inside of the U base 28 and whose one angle leg 78 is disposed on the U base 28 and whose other angle leg 80 reaches under the pivot bolt 40, spaced apart from it. The width of the projection 76 is less than the distance between the U legs 30 of the wiper arm 14.

Figure 9:
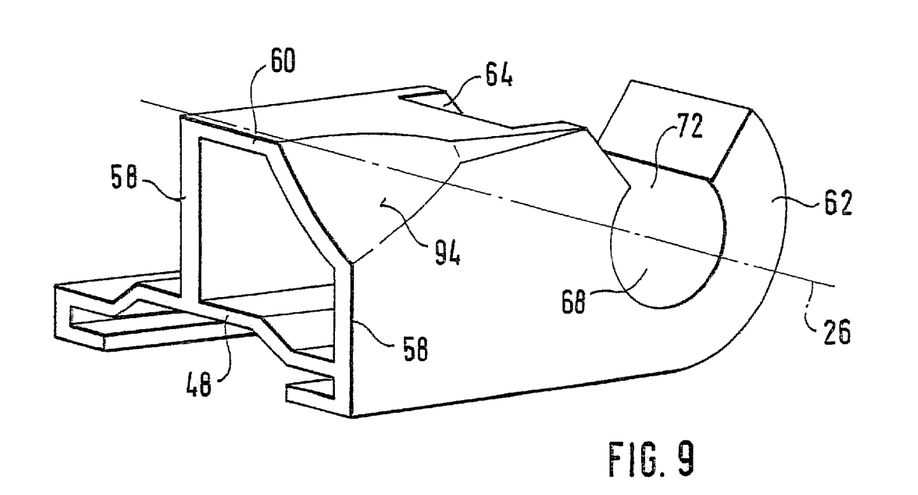
FIG. 9 is a perspective view of a coupling element provided with a bevel.

As shown in particular by FIG. 1, the wiper lip 18 of the wiper strip 20 extends from the underside 39 of the longitudinal or support strips 38 toward the window 10. A longitudinal rib 82 remaining between the two longitudinal grooves 36 connects the wiper strip 20 to a wind deflecting strip 84, which is embodied on a strip-like extension 86 of the wiper strip. The wind deflecting strip 84 extends over the entire length of the wiper blade or the longitudinal strips 38 and has a flow bevel 88 on its longitudinal side that is predominantly oriented toward the driving wind. In order to bring the coupling element 46 as close as possible to the longitudinal strips 38, the wind deflecting strip 84 is provided with a recess 90 in the longitudinally central region of the wiper blade and the coupling element 46 is disposed in this recess 90 (FIGS. 1 and 4). As shown in particular in FIGS. 3, 7, and 8, in terms of the longitudinal direction of the wiper blade, the box-like structure 56 of the coupling element 46 is disposed offset in relation to its base plate 48 to the side toward which the flow bevel 88 embodied on the wind deflecting strip 84 points. To further improve the contacting behavior of the wiper blade against the window to be wiped, even at high driving speeds, on its side that the driving wind predominantly flows against, the wiper arm 14 is provided with a bevel 92 that serves as a wind deflecting strip, and this bevel extends into the vicinity of the pivot pin 40 and consequently also into the box-like structure 56 of the coupling element 46. In order to maintain as low as possible a profile for the wiper blade and the wiper arm connected to it, the part of the structure 56 disposed in the vicinity of this bevel 92 is adapted to the course of the bevel 92. FIG. 9 shows that this can be achieved by means of a corresponding oblique surface 94 in the vicinity of the cover plate 60 and the associated side wall 58.

Figure 6:
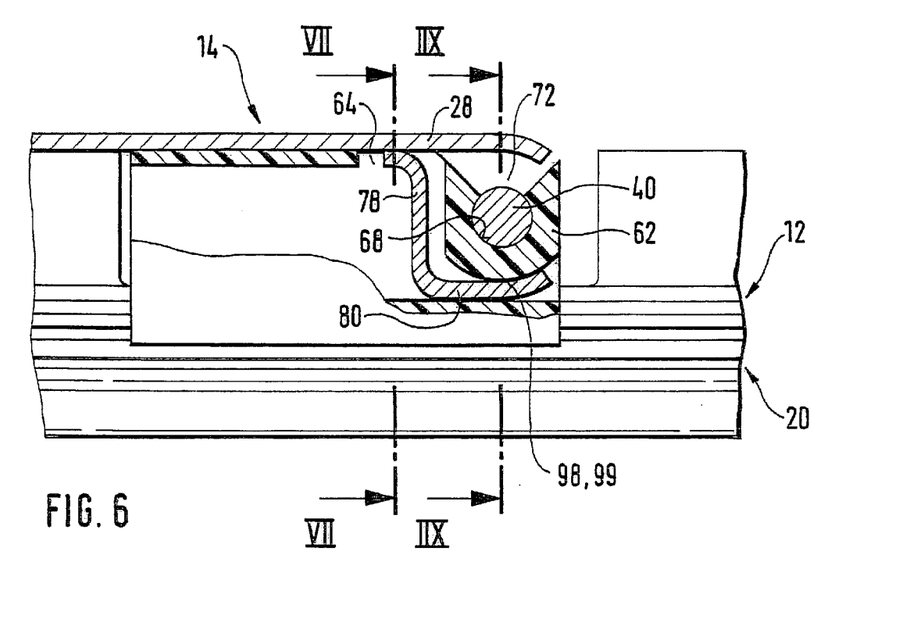
FIG. 6 shows the device according to FIG. 5 in the operating position.

In order to connect the wiper blade 12, which is provided with the coupling element 46, to the free end of in the wiper arm 14, these two components must be brought into a position in relation to each other which can be inferred from FIGS. 2 and 3. Then, the wiper blade 12 is moved toward the wiper arm in the direction of the arrow 96 in FIG. 5 so that the support block 62 comes to rest between the U base 28 and the other angle leg 80 of the projection 76. A corresponding dimensional match is naturally a prerequisite for this. From this intermediary installation position shown in FIG. 5, a relative motion is executed between the wiper arm 14 and wiper blade 12 in accordance with the pivot arrow 97 (FIG. 5) so that the operating position of the connecting device 42 shown in FIG. 6 is reached. To that end, the edge regions of the narrow point 72 elastically flex temporarily so that in the detent pivot position that is then reached, a certain detent locking has already been produced between the wiper arm 14 and wiper blade 12. The intermediary installation position depicted in FIG. 5 shows that the other angle leg 80 reaches through the slot 64 in the structure 56 of the coupling element 46. After the pivot motion according to arrow 97 in FIG. 5 has been executed, the operating position of the connecting device 42 shown in FIG. 6 is reached. The other angle leg 80 of the projection 76 is inserted into the recess constituted by the opening 66 between the base plate 48 and the support block 62. The inside of the other leg 80 oriented toward the support block 62 constitutes a stop shoulder 98, which cooperates with an opposing shoulder 99, which is embodied on the underside of the support block 62 oriented toward the base plate. It is consequently clearly evident that when the wiper arm is in the initial operating position, the stop shoulder 98 of the wiper arm 14 is disposed directly opposite and in immediate vicinity of the opposing shoulder 99 of the wiper blade 14. This prevents the pivot bolt 40 from being able to unintentionally come out of the transverse bore 68 of the support block. This device thus constitutes a locking means for securing the operating position between the transverse bore 68 and the pivot bolt 40. FIG. 6 also shows that in the operating position, the U base 28 of the wiper arm covers over the narrow point of the opening 72. The FIGS. 7 and 8 clearly show that the distance between the U legs 30 of the wiper arm 14 is matched to the distance between the two opposite longitudinal side faces or side walls 58 of the coupling element 46 and that the U legs 30 consequently encompass the longitudinal sides of the coupling element 46.

Because of its particular features, the connecting device according to the invention permits a particularly low profile of the wiper blade, whose height, together with the wiper arm connected to it, is only slightly enlarged and which furthermore represents an absolute securing of the wiper blade 12 against becoming unintentionally detached from the wiper arm 14. In order to detach the wiper blade 12 from the wiper arm 14, the wiper blade must be brought into the intermediary installation position shown in FIG. 5 in relation to the wiper arm 14, in which the detaching motion can be executed counter to the arrow 96.

What is claimed is:

1. A device pivotally connecting an elongated wiper blade (12) for a motor vehicle window (10) to a wiper arm (14) which can be moved between reversal positions and having a free end section, wherein said free end section is provided with a pivot bolt (40) extending essentially in a movement direction for connecting the elongated wiper blade, said wiper blade having an elongated, elastic support member (22) having an underside oriented toward the window, wherein said underside has an elongated wiper strip (20) disposed on it, wherein said wiper strip is placeable against the window (10), wherein the support member (22) has a coupling element (46) disposed thereon, said coupling element is provided with a transverse bore (68) that is open toward a top of the bore, wherein an opening width of said bore constitutes a narrow point (72) that is narrower than a diameter of the bore, wherein edge regions of the narrow point can be elastically spread open to a size of the bore diameter, characterized in that the support member has two elongated support strips comprised of a spring-elastic metal for holding the wiper strip (20), whose top (37) remote from the window (10) has the coupling element (46) disposed on it, wherein said coupling element is made of an elastic plastic and is provided with the transverse bore (68), wherein said two elongated support strips (38) are disposed in longitudinal grooves (36) of the wiper strip that are open at edges toward longitudinal sides of the wiper strip (20), and over at least one longitudinal section, the support strips (38) respectively protrude laterally out from the longitudinal grooves with an edge strip (44) and wherein the coupling element (46) is secured to the two edge strips of the support strips.

2. The device according to claim 1, wherein on longitudinal sides of the coupling element (46) and on an underside (39) of the coupling element oriented toward the longitudinal strips (38), L-shaped projections (50) extending toward the window (10) are provided, each said projection (50) having first L legs and second L legs, wherein one of said first L legs (52) intersects a plane in which the two support strips are disposed, and wherein starting from the first L legs (52), the respective second L legs (54) point toward each other and engage under the edge strips (44) of the support strips (38).

3. The device according to claim 2, wherein the coupling element (46) has a base plate (48) provided with the projections (50), wherein said base plate (48) supports a box shaped structure (56), wherein side walls (58) of the structure extending in longitudinal direction of the wiper blade (12) are connected to each other by means of a support block (62) that has the transverse bore (68), and wherein a slot (64) remains between the support block (62) and a top cover plate (60) of the structure (62).

4. The device according to claim 3, wherein a recess (66) is disposed between the support block (62) and the base plate (48) of the coupling element (46).

5. The device according to claim 3, wherein an opposing shoulder (99) for a stop shoulder (98) of the wiper arm (14) is embodied on an underside of the support block (62) oriented toward the base plate (48).

6. A device pivotally connecting an elongated wiper blade (12) for a motor vehicle window (10) to a wiper arm (14) which can be moved between reversal positions and having a free end section, wherein said free end section is provided with a pivot bolt (40) extending essentially in a movement direction for connecting the elongated wiper blade, said wiper blade having an elongated, elastic support member (22) having an underside oriented toward the window, wherein said underside has an elongated wiper strip (20) disposed on it, wherein said wiper strip is placeable against the window (10), wherein the support member (22) has a coupling element (46) disposed thereon, said coupling element is provided with a transverse bore (68) that is open toward a top of the bore, wherein an opening width of said bore constitutes a narrow point (72) that is narrower than a diameter of the bore, wherein edge regions of the narrow point can be elastically spread open to a size of the bore diameter, characterized in that the support member has at least one elongated, spring-elastic support strip for holding the wiper strip (20), whose top (37) remote from the window (10) has the coupling element (46) disposed on it, wherein said coupling element is made of an elastic plastic and is provided with the transverse bore (68), wherein the device is provided with locking means (98, 99) for securing an operating position between the transverse bore (68) and the pivot bolt (40), wherein the locking means have a stop shoulder (98), said stop shoulder disposed on the wiper arm (14) pointing away from the window (10), and wherein said stop shoulder is associated with an opposing shoulder (99) of the coupling element (46) oriented toward the window (10).

7. The device according to claim 6, wherein the stop shoulder (98) is embodied on a projection (76) of the wiper arm (14) that protrudes toward the window (10).

8. A device pivotally connecting an elongated wiper blade (12) for a motor vehicle window (10) to a wiper arm (14) which can be moved between reversal positions and having a free end section, wherein said free end section is provided with a pivot bolt (40) extending essentially in a movement direction for connecting the elongated wiper blade, said wiper blade having an elongated, elastic support member (22) having an underside oriented toward the window, wherein said underside has an elongated wiper strip (20) disposed on it, wherein said wiper strip is placeable against the window (10), wherein the support member (22) has a coupling element (46) disposed thereon, said coupling element is provided with a transverse bore (68) that is open toward a top of the bore, wherein an opening width of said bore constitutes a narrow point (72) that is narrower than a diameter of the bore, wherein edge regions of the narrow point can be elastically spread open to a size of the bore diameter, characterized in that the support member has at least one elongated, spring-elastic support strip for holding the wiper strip (20), whose top (37) remote from the window (10) has the coupling element (46) disposed on it, wherein said coupling element is made of an elastic plastic and is provided with the transverse bore (68), wherein in a vicinity of the pivot bolt (40), the wiper arm (14) has two side walls (32) spaced apart from and parallel to each other, wherein said side walls are aligned protruding toward the window (10) and which each secure one end of the pivot bolt (40), wherein the side walls (32) are constituted by legs (30) of the wiper arm (14) which has a U-shaped cross section at least in parts, wherein a projection (76) is disposed on an inside of a U base (28) oriented toward the window (10), and wherein the U legs (30) encompass longitudinal sides of the coupling element (46).

9. The device according to claim 8, wherein the distance between the U legs (30) is matched to a distance between two opposite longitudinal side faces of the coupling element (46).

10. The device according to claim 8, wherein the U base (28) of the wiper arm (14) covers over a narrow point of the transverse bore (68) in an operating position.

11. The device according to claim 8, wherein the U base (28) of the wiper arm (14) disposed in an operating position covers over a narrow point (72) of the transverse bore (68) and a stop shoulder (98) of the wiper arm is disposed directly opposite from and in a vicinity of an opposing shoulder (99) of the wiper blade (12).

12. The device according to claim 8 wherein the U leg of the wiper arm (14) that a driving wind predominantly flows against is provided with a bevel (92) that serves as a wind deflecting strip, and a part of a box shaped structure (56) of the coupling element disposed in a vicinity of this bevel (92) is adapted to a course of the bevel.

13. A device pivotally connecting an elongated wiper blade (12) for a motor vehicle window (10) to a wiper arm (14) which can be moved between reversal positions and having a free end section, wherein said free end section is provided with a pivot bolt (40) extending essentially in a movement direction for connecting the elongated wiper blade, said wiper blade having an elongated, elastic support member (22) having an underside oriented toward the window, wherein said underside has an elongated wiper strip (20) disposed on it, wherein said wiper strip is placeable against the window (10), wherein the support member (22) has a coupling element (46) disposed thereon, said coupling element is provided with a transverse bore (68) that is open toward a top of the bore, wherein an opening width of said bore constitutes a narrow point (72) that is narrower than a diameter of the bore, wherein edge regions of the narrow point can be elastically spread open to a size of the bore diameter, characterized in that the support member has at least one elongated, spring-elastic support strip for holding the wiper strip (20), whose top (37) remote from the window (10) has the coupling element (46) disposed on it, wherein said coupling element is made of an elastic plastic and is provided with the transverse bore (68), wherein a wind deflecting strip (84) is provided, said wind deflecting strip (84) coupled with said wiper strip and extending beyond a top band surface (37) of the support member, wherein the coupling element (46) is disposed in a recess (90) of the wind deflecting strip (84), wherein a box shaped structure (56) of the coupling element (46) is offset in relation to a base plate (48) of the coupling element to a side toward which a flow bevel (88) formed on the wind deflecting strip (84) points, when viewed in a longitudinal direction of the wiper blade.

* * * * *